United States Patent [19]
Stöferle et al.

[11] 3,964,367
[45] June 22, 1976

[54] DEVICE FOR MACHINING TROCHOIDAL INNER WALLS, ESPECIALLY FOR THE CYLINDERS OF WANKEL ENGINES

[75] Inventors: Theodor Stöferle, Seeheim; Jochen Klaar, Hamburg; Bernhard Bellmann, Pfungstadt; Paul-Heinz Theimert, Weiterstadt, all of Germany

[73] Assignees: Theodor Stoferle, Seeheim; Jochen Klaar, Hamburg, both of Germany

[22] Filed: Aug. 9, 1973

[21] Appl. No.: 387,131

[30] Foreign Application Priority Data
Aug. 11, 1972 Germany............................ 2239568

[52] U.S. Cl................................. 90/11 C; 90/15 A; 51/33 W; 51/DIG. 32
[51] Int. Cl.²............................................ B23C 3/04
[58] Field of Search .................. 90/24 , 24.3, 15 A, 90/15 R, 20, 11; 51/33 R, 33 W, DIG.32

[56] References Cited
UNITED STATES PATENTS
3,757,474  9/1973  Pedersen....................... 51/DIG. 32
3,812,574  5/1974  Jones et al..................... 51/DIG. 32

*Primary Examiner*—Gil Weidenfeld
*Attorney, Agent, or Firm*—Walter Becker

[57] ABSTRACT

A machine for machining the inner walls of the cylinder of a Wankel engine in which a support is provided for the cylinder to be machined which rotates the cylinder about a first axis in one direction with the first axis moving bodily about a second axis in the opposite direction. Cutting tools are provided which engage the inside of the wall of a cylinder mounted on the support and effect cutting thereof during movement of the cylinder. The tools are mounted on support elements which are pivotal about lines substantially coinciding with the lines of engagement of the respective tools with the cylinder wall of the cylinder and are pivoted during movement of the cylinder to maintain substantially the same cutting conditions between each tool and the cylinder.

20 Claims, 4 Drawing Figures

DEVICE FOR MACHINING TROCHOIDAL INNER WALLS, ESPECIALLY FOR THE CYLINDERS OF WANKEL ENGINES

The present invention relates to a device for machining by chip removal of substantially trochoidal inner walls or inner walls equidistant thereto, especially for the cylinders of Wankel engines. The workpiece is mounted on a moving support which describes a trochoidal path, the workpiece moving along the substantially stationary machining unit during the machining operation. At least one fast rotating machining tool engages the inner wall of the cylinder. The engaging or chip removing conditions of the tool are kept constant by pivoting the center of rotation of the tool during the machining operation in conformity with the change in the angle of the normal with regard to the inner wall of the cylinder.

The basic principle of such heretofore known machine tools consists in imitating by means of the tool the relative movement of the rotor or rotary piston of the Wankel engine and in this way directly to produce the inner wall of the cylinder in conformity with an epitrochoid. The pivoting characteristic of the tool which is necessary for this purpose is mathematically defined and can be generated by means of transmission mechanics known per se, for instance, by means of a cam disc or the like. Such transmission mechanics, however, require a considerable number of elements for each tool which takes up to a great extent the usually small space above the cylinder opening of the workpiece and therefore allows operation of a single tool only in time consuming manner. In particular when mass producing the respective workpiece, during which operation the machining is effected in machine tool assembly line, a time consuming machining operation on individual machine tools involves considerable drawbacks because either the short machining time obtainable with other machines cannot be fully taken advantage of or the assembly line has to be split up where a time consuming operation is to be effected so that a plurality of identical machine tools will be alternately loaded and the time consuming machining operation is simultaneously carried out on different machine tools. Both possibilities, however, have a disadvantage effect upon the economy of the manufacturing process so that a primary object in this connection consists in reducing the necessary machining time without affecting the quality of such machine tool which with regard to the character of the respective machining operation will require an unduly long machining time for each workpiece.

With the above in mind, it is an object of the present invention with the above described machining by chip removal to obtain a considerable decrease in the required machining time without disadvantageously affecting the working conditions which aim at a high machining quality. By chip removal is meant any chip removal by means of a defined cutting edge, such as milling, and also a chip removal by means of a nondefined cutting edge, such as grinding.

This object and other objects and advantages of the invention will appear more clearly from the following specification in connection with the accompanying drawings, in which:

FIG. 1 is a perspective diagrammatic illustration of the essential parts of a machine tool according to the invention.

FIG. 2 diagrammatically illustrates a simplified top view of the generation of the movement of the work table for describing the trochoid.

Figure 1:
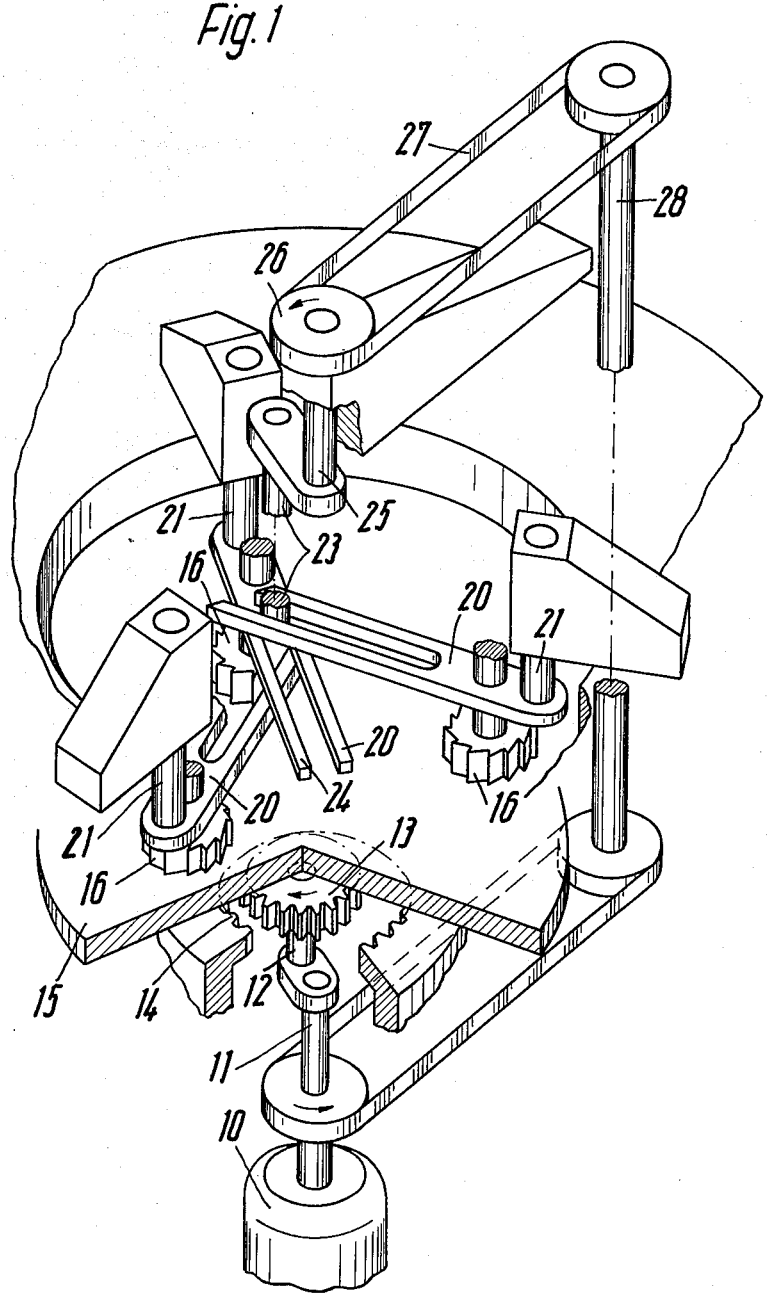

The above referred to problems underlying the present invention have been solved according to the present invention by the fact that the machining unit comprises at least two machining tools but not more than a number of machining tools which exceeds by one of the number of the arcs of the trochoid, which machining tools are located where normally the tips of the pertaining rotary piston are located.

The device for machining by chip removal according to the present invention is furthermore characterized in that for purposes of controlling the pivoting movements of all machining tools in conformity with the respective angular changes between the normal and the trochoid radius pertaining to the same point of the inner wall there is provided a single control element which in a positive manner engages the machining tools.

The employment of a single control element which is common to all machining tools and in a positive manner transfers or conveys the control movement will make it superfluous to employ a device for controlling the pivoting movements of the individual tools as it is necessary with a multiplied mechanism in conformity with the employment of a plurality of tools. Only in this way the simultaneous employment of a plurality of tools combined to a machining unit will become possible whereby the machining time is considerably reduced.

A structurally very simple and space saving further development of the invention consists in that the axis of each machining tool is located in a guiding element which is pivotable about a pivot point which, when viewed in the direction of the axis of rotation of the tools, approximately coincides with the cutting line and which is positively connected to the control element. For effecting the pivoting movement, a guiding pin which describes a circle engages couliss-shaped guiding means of each guiding element. Such guiding means operate in a very precise manner in spite of the fact that structurally only a few elements are necessary.

Particularly when machining very small engine housings, it is provided according to a further development of the invention that the guiding elements on that side of their pivot point which is located opposite to the tool axis are connected to the control element whereby the narrow space between the tools is kept free as far as possible. In this connection each guiding pin is advantageously eccentrically connected to a rotating wheel, preferably a gear, which is driven by the control element. In a particularly simple and space saving manner, as control element there is provided a toothed belt or the like for driving the wheels with the guiding pins. With such outwardly located control, the correct cycle of the control movements is realized without difficulties due to the fact that the wheels rotate in the same direction as the center point of the workpiece at a multiple of the speed of the workpiece, the multiple equalling the number of the arcs of the trochoid plus one.

A particularly compact construction is obtained by the fact that the guiding elements are on that side of the tool axis which is located opposite their point of rotation connected to the control element. In a surprising manner, the number of elements making up the device and required for the control of the pivoting movement is additionally reduced by the fact that a single pin simultaneously engages the coulisse-shaped guiding means of all guiding elements. This single pin rotates on a circular path in the same direction as the direction of the workpiece center point and at a multiple of the speed of the workpiece with multiple equals the number of the arcs of the trochoid plus one. This pin, when viewed in the direction of the tool axis, coincides at any time with the momentary rolling point between a pinion which moves on a circular path and is fixedly connected to the supporting table for producing the trochoid-shaped movement of the workpiece and a stationary gear ring which in view of its meshing engagement brings about the turning of the pinion.

As has been confirmed by model tests, with such a design and arrangement of the control mechanics, each individual tool by itself will align itself with the direction of the normal to the inner wall of the tool without any further steps being necessary. Thus, the normal-control of all tools can be realized by a single centrally arranged pin which is moved with the mentioned speed on the described circular path. The requirements as to the individual elements and space is reduced to a minimum.

The device according to the present invention becomes structurally particularly simple when the pin is eccentrically arranged on a wheel, preferably a gear, which is positively driven by the control element. As control element there may be provided a toothed belt or a gear. A single additional shaft carrying two gears of equal size will suffice for the drive of the control mechanism or its central pin if this shaft is, on the one hand, drivingly connected to the drive shaft of the pinion and, on the other hand, is drivingly connected to the gear equipped with the pinion.

Referring now to the drawings in detail, which by way of example illustrate a machining by millers, the arrangement shown therein comprises a driving member 10, for instance an electric motor, which drives a shaft 11. Shaft 11 is provided with an arm supporting a pin 12 eccentric to shaft 11 and having rotatably arranged thereon a pinion 13. When the shaft 11 rotates, the center of the pinion 13 carries out a circular movement the radius of which corresponds to the eccentricity of the pin 12 with regard to the shaft 11. The pinion 13 has its outer circumference in mesh with an outer gear ring 14 the radius of the rolling circle of which equals the eccentricity of the pin 12 plus the radius of the rolling circle of pinion 13. During a rotation of shaft 11, the pinion 13 therefore rolls on the inner circumference of the gear ring 14. Rigidly connected to the pinion 13 is a supporting table 15 for supporting the non-illustrated workpiece. The movement of the supporting table 15 will, when the shaft 11 rotates, be composed of the superposition of the circular path of pin 12 or the center point of pinion 13 and of the rotation of the pinion 13 about its center point, which rotation occurs when the pinion 13 rolls on the gear ring 14. The eccentricity of pin 12 and the radius of the rolling circle of pinion 13 are in conformity with the mathematical requirements so selected that the workpiece chucked onto the supporting table 15 is rotated along an epitrochoidal path of movement.

Along the epitrochoidal inner wall of the chucked workpiece, for instance, a three-point rotary piston of a Wankel engine could rotate. It is important that, for instance in view of the shown drive, the movement of the supporting table 15 to be so controlled that a piston arranged in a thus rotating cyclinder and having its tips in continuous contact with the inner wall remains stationary with regard to the machine, whereas the eccentric rotational movement carried out by the rotary piston of a running Wankel engine in a stationary cylinder will in this instance be inversely taken over by the cylinder. If this condition is met, namely that the engine housing chucked onto the supporting table 15 is so moved that a rotary piston arranged in the cylinder remains immovable, it is then possible instead of the tips of the customary rotary piston to arrange stationary work tools for machining the inner wall of the cylinder.

The drawings show three tools 16 for milling the inner wall of the cylinder. The tools 16 arranged along a circle and offset with regard to each other by 120° each have their outer circumferential surface engage the inner wall of the workpiece (not illustrated). During a rotation of shaft 11, the cylinder inner wall of the workpiece is moved along the outer circumference of each of the three tools. When the tools 16 by non-illustrated driving elements are subjected to a rotary movement, it will be appreciated that when passing the workpiece or when rotating the shaft, the continuous or progressive machining of the cylinder inner wall is effected. As will be evident from FIGS. 2 and 3 in particular, the trochoidal shape of the cylinder wall 17 brings about that when the cylinder inner wall moves relative to the tools 16, the direction of a plane 18 containing the axis of rotation of a tool and perpendicular to the surface 17 engaged by the tool at 19 is continuously changed. With an absolutely stationary tool 16, also the cutting conditions vary in an disadvantageous manner. Thus, care has to be taken that the tools 16 during their machining operations are continuously pivoted in such a way that the cutting angle of the tool will be the same for each area of the cylinder inner wall 17 being machined by the tools.

To this end, each tool 16 is mounted on a guiding element 20 which latter, according to the above described embodiment is in the manner of a pivotable lever in its turn mounted on the machine housing by means of a pin 21 which is parallel to the axis of rotation of the tools 16 and, more specifically, in such a way that in top view (see FIG. 3) the bearing pins 21 coincide with the points of intersection 19 of the tools 16 or are located on the contour of the inner wall 17 of the cylinder. A pivoting of the guiding elements 20 and thus the tools 16 in conformity with the direction of the arrows 22 (FIG. 3) thus does not change the position of the points of intersection 19 but changes the cutting angle of the machining tools 16.

Figure 2:
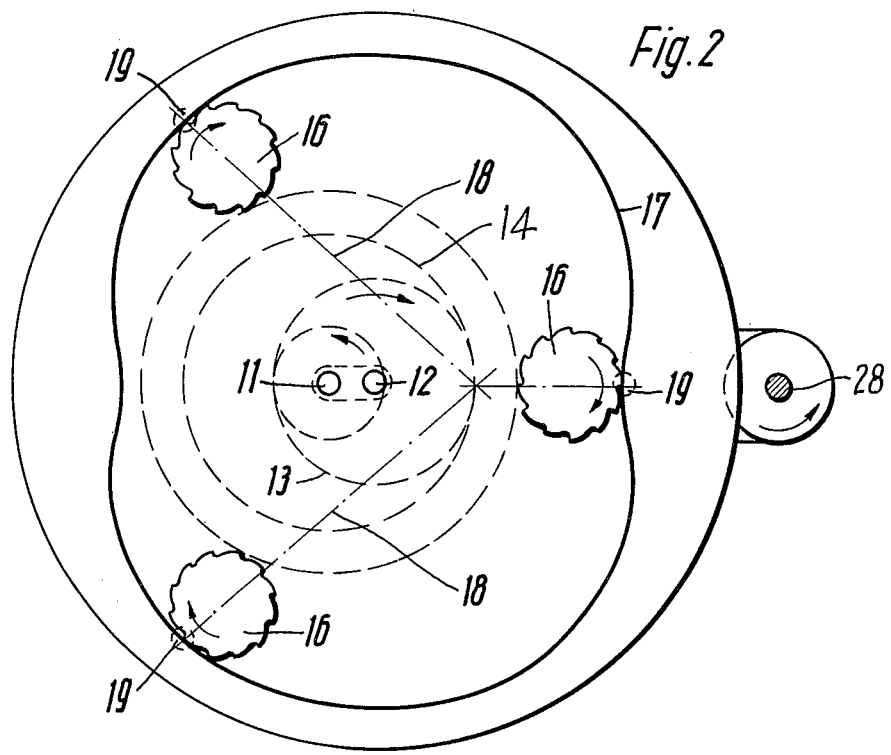
Figure 3:
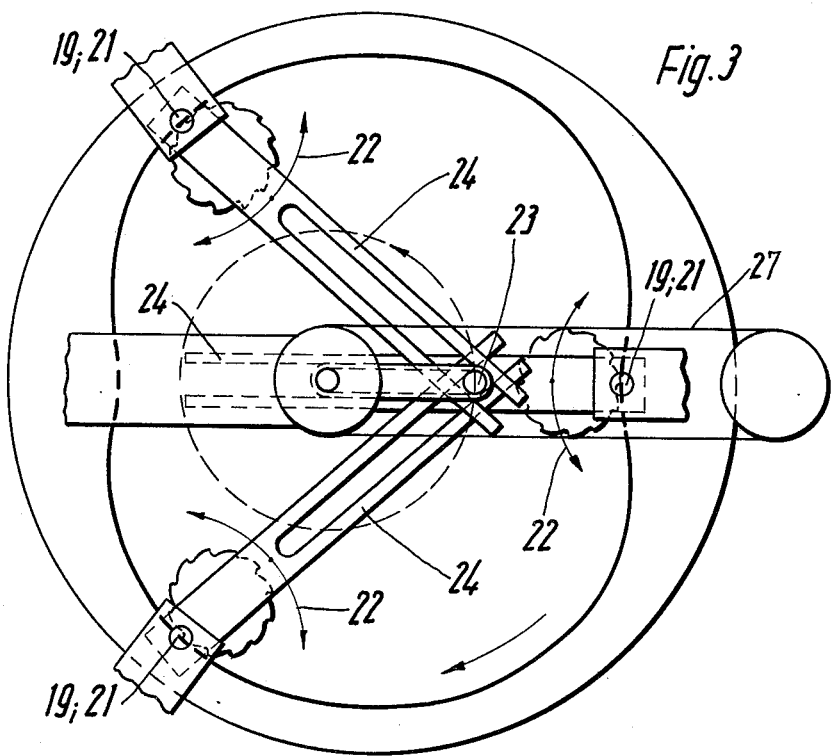
FIG. 3 illustrates similar to FIG. 2 the normal-control of the tools.

This pivoting movement of the guiding elements 20 is in the above mentioned embodiment realized in a surprisingly simple manner by means of a pin 23 which moves on a circular path and which engages coulisse-shaped guiding means 24 of all three guiding elements 20 at the same time. To this end, the guiding pin 23 is connected to an arm having a shaft 25 eccentric to pin 23 which by means of a gear 26 is moved by a control element 27 in the form of a toothed belt. The control element 27 is through the intervention of a shaft 28 drivingly connected to the drive shaft 11 of the motor 10. With a transmission ratio of 1 : 1 in the above described driving connection between the motor shaft 11 and the shaft 25, and with the relative number of teeth on the pinion 13 and ring gear 14, the pinion rotates three times on each revolution about the axis of ring gear 14, and the guiding pin 23 rotates at the same speed and in the same direction as the pin 12 carrying the pinion 13, or at three times the rotational velocity of the supporting table 15. This table 15 rotates in the opposite direction. With extremely few elements, therefore, a simultaneous control of all three tools 16 is obtainable while the cutting conditions are maintained constant. The equipment for the simultaneous normal-control of a plurality of tools 16 is, according to the above mentioned embodiment, limited to one guiding element 20 each respectively pertaining to the respective tool 16 and to a common guiding element 23 moving through a simple circular path, which guiding element 23 is by means of the control member 27 kept in synchronous movement with the shaft of the drive motor for the movement of the workpiece. However, also with a non-illustrated control from the outside, the necessary equipment is only slightly increased. This, however, likewise permits a simultaneous application of a plurality of tools since radially outwardly of the circle formed by the arrangement of the tools 16 the space conditions are not so restricted. The selection of an outside control is expedient when in view of the small dimensions of the trochoid to be machined the tools 16 would approach each other so closely that special difficulties are encountered when carrying out the illustrated inner control. In such an instance, it is merely necessary to extend the guiding elements 20 not toward the interior but rather radially outwardly beyond the pivot point on the rotary pin 21, and here to provide the guiding elements 20 with a coulisse-shaped guiding means similar to the guiding means 24. Then each guiding element 20 has associated therewith a circularly moved crankpin similar to the pin 23 which crankpin under the same conditions as the guiding pin 23 is by means of a single guiding element driven in a positive manner and, as the case may be, also by the drive shaft 11 of the motor 10. While, however, the guiding pin 23 of the inner control is driven in a direction counter to the driving direction of the supporting table 15 or the workpiece, it will be appreciated that with the outer control the pins arranged on the other side of the rotary pin 21 rotate in the same direction as the supporting table. The eccentricity of the outwardly arranged guiding pins depends on the distance of the rotary center point of rotary pin 21, whereas with the illustrated inner control the eccentricity corresponds to the rolling circle radius of the gear ring 14 as illustrated in FIGS. 2 and 3.

It is obvious that with the device according to the invention it is possible not only to machine precise trochoid-shaped inner walls but also such workpieces the walls of which have a shape which is equidistant to the trochoid proper. To this end, the tools 16 have to be displaced along the guiding elements 20. Such displaceability may furthermore be provided for feeding or post-setting as well as for a controlled deviation of the path of the tools 16 which path is cyclic and refers back to the tools.

Figure 4:
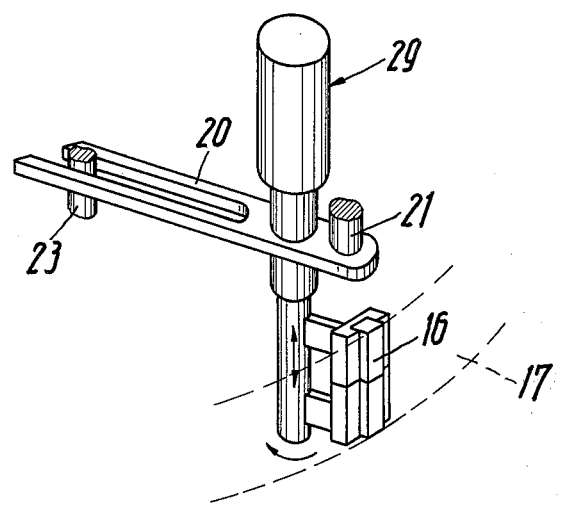
FIG. 4 shows in perspective view a machining with an oscillating tool for honing, grinding, or the like operations.

According to the embodiment of FIG. 4, instead of a milling tool 16 there is provided a tool 16 with a non-defined cutting edge, this tool being driven by an oscillator 29. Also for such grinding or honing tools, the simultaneous normal-control of a plurality of tools 16 according to the invention is without difficulties applicable as will be evident from a comparison of the broadened analogous illustration of FIG. 1.

It is, of course, to be understood that the present invention is, by no means, limited to the specific showing in the drawings, but also comprises any modifications within the scope of the appended claims.

What is claimed is:

1. A machine for machining the inner wall of a cylinder for a Wankel engine in which the cylinder moves about rotary cutting tool means in a substantially trochoidal path, said machine comprising: a workpiece support for said cylinder, at least two cutting tools, pivoted arms supporting the cutting tools in spaced relation with each arm supported on its respective pivot, bearing means for rotatably supporting said workpiece support about a first axis, a rotatable member supporting said bearing means for rotation about a second axis spaced from said first axis while the workpiece support rotates in the opposite direction on said bearing means, a single control element engaging said arms for pivotal movement and means driving said rotatable member and said control element simultaneously to move said arms about their respective pivots to maintain substantially constant the angle between a first plane passing through the center of rotation of each tool and the pivotal axis of its respective pivoted arm and a second plane tangent to an arcuate portion of the inner wall of the workpiece at the line of contact of the respective tool therewith.

2. A machine according to claim 1 in which said cutting tool means comprises an abrasive member, and means are included for reciprocating said abrasive member in the axial direction of the cylinder during movement of the cylinder.

3. A machine according to claim 1 in which the pivot supporting each arm is parallel to the axis of rotation of the workpiece support and is located at the line of engagement of the periphery of the respective cutting tool with the cylinder during a cutting operation.

4. A machine according to claim 3 in which the rotary cutter tools are equal in number to one more than the number of lobes of the cylinder and are disposed individually to engage the cylinder respectively at the same points where the cylinder ultimately will be engaged by the tips of an epitrochoidal piston mounted therein.

5. A machine according to claim 1 in which each tool supporting arm is slotted lengthwise and said single control element includes pin means parallel to the axis of rotation of the workpiece support and engaging the slots in the arms, and means for driving said pin means in a circular path.

6. A machine according to claim 5 which includes drive means operable to drive said pin means in synchronism with said workpiece support.

7. A machine according to claim 3 which includes a pinion fixed to the workpiece support rotatable on said bearing means, a stationary ring gear surrounding said pinion and meshing therewith, a drive shaft coaxial with the ring gear driving said rotatable member, which forms a crank arm fixed to said drive shaft and rotatably supporting said pinion, said cutting tool means comprising circumferentially distributed rotary cutters equal in number to one more than the number of lobes to be formed in the cylinder and located to engage the cylinder at the same spacing as the tips of an epitrochoidal piston operatively mounted in a machined cylinder, the arm supporting each cutter having the pivotal support therefor on an axis which substantially coincides with the line of engagement of the respective cutter with a cylinder mounted on the workpiece support, said arms extending toward one another and being longitudinally slotted and in overlapping relation, a control element comprising a pin parallel to the axis of rotation of the workpiece support and engaging the slots in said arms, said pin being coaxial with the point of engagement of said pinion with said ring gear, and means driving said control element at a speed equal to the speed of rotation of said crank arm and in the same direction.

8. A machine according to claim 7 in which said means for driving said pin comprises a member coaxial with said drive shaft and supporting said pin for bodily rotation about the axis of said ring gear and said means for driving said pin comprises slip free drive means extending from said drive shaft to said member and having a one to one drive ratio.

9. A machine according to claim 8 in which said slip free drive means includes toothed belts.

10. The method of machining a substantially trochoidal surface on the inside of a cylinder for a Wankel engine which comprises: rotating the cylinder in one direction about a first axis while rotating said first axis in a circular path about a second axis in the opposite direction, engaging the inside of the cylinder with at least two cutting tools engaging at spaced positions on the inside of the cylinder during movement of the cylinder, each of said tools being supported about an axis on a pivoted member, the axis of each pivoted member being spaced from the axis of the tool thereon and coinciding with the position of engagement of the tool with the cylinder, and pivoting the tools simultaneously about the respective axes of said pivoted members in a manner to maintain a substantially constant angular relation between a first plane containing the axis of each respective tool and the position of engagement of the tool with the cylinder and a second plane tangent to the surface being machined at said position of engagement.

11. The method according to claim 10 which includes rotating the cylinder on said first axis at a speed 3/2 times the speed of rotation of the first axis about the second axis.

12. The method according to claim 10 which includes engaging the inside of the cylinder with three tools spaced equally circumferentially of the cylinder, and pivoting the tools simultaneously during movement of the cylinder.

13. An apparatus for machining a substantially trochoidal surface on the wall of a cavity in a workpiece, said apparatus comprising: a workpiece support table adapted to support a workpiece to be machined, bearing means supporting said table for rotation on an axis parallel to the axis of the cavity in a workpiece thereon, a crank arm supporting said bearing means for bodily rotation thereof in parallelism with itself in one direction and means for simultaneously rotating said table on said bearing means in the opposite direction whereby a point on the inner wall of the workpiece follows a trochoidal path, cutting tools equal in number to at least one more than the number of lobes in the trochoidal surface being machined and rotatable on axes parallel to the axis of said cavity and disposed in circumferentially distributed relation adjacent the wall of the cavity of a workpiece on said table, a lever supporting each said tool, a stationary pivot element rotatably supporting each said lever on an axis parallel to the axis of the cavity, control means engaging said levers in a region spaced from the respective said pivot elements and movable for causing said levers to pivot simultaneously on said pivot elements and thereby move said tools, and means for actuating said control means in synchronism with the movement of said table to cause pivotal movement of said levers to maintain the planes containing the axes of rotation of the respective tools and the pivot axes of the levers perpendicular to the respective planes tangent to the arcuate surface at the lines of contact of the tools with the surface on the workpiece being machined.

14. An apparatus according to claim 13 in which the axis of each said pivot element is substantially coaxial with the peripheral region of the respective tool which engages the workpiece.

15. An apparatus according to claim 13 in which said control means is a control pin, arm means supporting the pin, said means for actuating said control means driving said arm means for rotation about an axis parallel to the axes of said pivot elements and on the opposite sides of the respective tools therefrom, said levers being slotted and the pin being fitted into the slots in the levers.

16. An apparatus according to claim 13 in which said control means comprises a control element engaging each said lever and disposed on the opposite side of the pivot elements from the respective tools, a rotary member eccentrically supporting each control element, and means for driving said rotary members in synchronism.

17. An apparatus according to claim 16 in which said means drives said rotary members in the same direction of rotation as the workpiece supporting table and at a speed equal to the speed of rotation of the table multiplied by one more than the number of lobes in the surface being machined.

18. An apparatus according to claim 15 in which said means driving said arm means rotates said arm means in a direction opposite to the direction of rotation of the workpiece supporting table and at a speed equal to the speed of the table multiplied by one more than the number of lobes in the surface being machined.

19. An apparatus according to claim 18 in which said arm means is positively operatively connected to the said table to rotate in synchronism therewith.

20. An apparatus according to claim 17 in which said rotary members are positively operatively connected to the said table to rotate in synchronism therewith.

* * * * *